United States Patent
Mizunaga et al.

(10) Patent No.: US 9,976,410 B2
(45) Date of Patent: May 22, 2018

(54) METHOD FOR MEASURING UNDERGROUND BORING POSITION AND UNDERGROUND BORING POSITION MEASURING APPARATUS

(71) Applicants: KYUSHU UNIVERSITY, NATIONAL UNIVERSITY CORPORATION, Fukuoka (JP); YBM Co., Ltd., Saga (JP)

(72) Inventors: Hideki Mizunaga, Fukuoka (JP); Toshiaki Tanaka, Fukuoka (JP)

(73) Assignees: KYUSHU UNIVERISITY, NATIONAL UNIVERSITY CORPORATION, Fukuoka-shi, Fukuoka (JP); YBM Co., Ltd., Karatsu-shi, Saga (JP)

( * ) Notice: Subject to any disclaimer, the term of this patent is extended or adjusted under 35 U.S.C. 154(b) by 119 days.

(21) Appl. No.: 15/113,446

(22) PCT Filed: Jan. 23, 2015

(86) PCT No.: PCT/JP2015/051889
§ 371 (c)(1),
(2) Date: Jul. 22, 2016

(87) PCT Pub. No.: WO2015/111713
PCT Pub. Date: Jul. 30, 2015

(65) Prior Publication Data
US 2017/0002648 A1     Jan. 5, 2017

(30) Foreign Application Priority Data

Jan. 24, 2014  (JP) ................................. 2014-011865

(51) Int. Cl.
*G01V 1/40*     (2006.01)
*E21B 47/09*    (2012.01)
(Continued)

(52) U.S. Cl.
CPC .......... *E21B 47/0905* (2013.01); *E21B 7/046* (2013.01); *E21B 47/024* (2013.01);
(Continued)

(58) Field of Classification Search
CPC ............... E21B 47/0905; E21B 47/024; E21B 47/02224; E21B 7/04; E21B 47/02216; E21B 7/046; G01V 3/26; G01P 15/18
(Continued)

(56) References Cited

U.S. PATENT DOCUMENTS 6,868,921 B2 * 3/2005 Burrows .................. E21B 7/046
                                                              175/26
8,659,298 B2 * 2/2014 Brune ............... E21B 47/02224
                                                              175/61
2010/0253537 A1  10/2010 Brune et al.

FOREIGN PATENT DOCUMENTS

JP     H03-285111    12/1991
JP     2002-220986    8/2002
(Continued)

OTHER PUBLICATIONS

"International Search Report (Form PCT/ISA/210) of PCT/JP2015/051889", dated Apr. 21, 2015, with English translation thereof, pp. 1-5.
(Continued)

*Primary Examiner* — An Do
(74) *Attorney, Agent, or Firm* — JCIPRNET

(57) ABSTRACT

The rotation angle around x axis, inclination angle and directional angle of a boring bit are obtained from the value measured with an accelerometer (22) and a three axis magnetic sensor integrally provided within the boring bit attached to the top of a rod array for boring. From these obtained values and the length corresponding to a rod, the amount of varied position according to boring by a length
(Continued)

corresponding to a rod is obtained for each directional component. Further, the position of boring corresponding to boring in plural times with successive addition of rods is obtained through accumulating the amount of varied position for each directional component in respect of boring in plural times.

8 Claims, 5 Drawing Sheets

(51) Int. Cl.
  *E21B 47/024*   (2006.01)
  *G01C 21/12*   (2006.01)
  *E21B 7/04*   (2006.01)
  *G01V 3/26*   (2006.01)
  *G01P 15/18*   (2013.01)

(52) U.S. Cl.
  CPC ............... *G01C 21/12* (2013.01); *G01V 3/26* (2013.01); *G01P 15/18* (2013.01)

(58) Field of Classification Search
  USPC ..................................................... 702/2, 6, 9
  See application file for complete search history.

(56) References Cited

FOREIGN PATENT DOCUMENTS

| | | |
|---|---|---|
| JP | 2002-303516 | 10/2002 |
| JP | 2004-150222 | 5/2004 |
| JP | 2004-309227 | 11/2004 |
| JP | 2005-003641 | 1/2005 |
| JP | 2012-251870 | 12/2012 |
| JP | 2014-041117 | 3/2014 |

OTHER PUBLICATIONS

Heisei 22 Nendo Senryakuteki Kiban Gijutsu Kodoka Shien Jigyo, "Hikaisakukoho-yo Koseido Kussaku System no Kaihatsu", Kenkyu Kaihatsu Seika To Hokokusho, Japan Small and Medium Enterprise Agency, Sep. 2011, pp. 1-22.

\* cited by examiner g : gravitational vector
m : terrestrial magnetism vector
p : directional vector of boring bit

METHOD FOR MEASURING UNDERGROUND BORING POSITION AND UNDERGROUND BORING POSITION MEASURING APPARATUS

CROSS-REFERENCE TO RELATED APPLICATION

This application is a 371 application of the international PCT application serial no. PCT/JP2015/051889, filed on Jan. 23, 2015, which claims the priority benefit of Japan application no. 2014-011865, filed on Jan. 24, 2014. The entirety of each of the above-mentioned patent applications is hereby incorporated by reference herein and made a part of this specification.

BACKGROUND OF THE INVENTION

Technical Field

The present invention relates to a method for measuring underground boring position and an underground boring position measuring apparatus, and particularly relates to such a method and apparatus used in non-open cut working method performed without open cut of the ground.

Description of Related Art

A non-open cut method is a boring method of an energy saving type for burying water piping, gas piping or the like without performing open cut of the ground and it is expected to be utilized in the case of ground improvement working directly under the structures having been already constructed as a measure against ground liquefaction brought by earthquake or in the case of underground boring generally in a large scale without performing open cut.

On the other hand, in order to perform boring along a preset course without performing open cut of the ground in non-open cut working method, it is necessary to grasp the top position of the boring at all time on the ground. For measuring the position of the bit at the top of the boring used in a non-open cut working method, a measuring method is conventionally used such as to presume the position of the bit by receiving, on the ground, the electromagnetic signal issuing from the sensor attached to the top of the boring tool positioned underground. However, with this measuring method, the position of the bit cannot be measured in a situation where there are some obstacles upward from the position for measurement such as a construction, a river, etc.

Patent Document 1 discloses an example of conventional underground position measuring apparatus. In this apparatus, an accelerometer and a gyroscope are provided in a moving tool for moving in an intricate space in water or underground and the position is obtained through calculation using an angular velocity measured with a gyroscope and an acceleration measured with an accelerometer. Patent Document 2 discloses a method and an apparatus for measuring direction and inclination, in which a measured body having a conical measured face is held, within the apparatus body, in a freely inclining manner at the point in the direction through the apex of the cone, a displacement measurer with a light emitting portion irradiating laser beam to the conical measured face and a light receiving portion is provided and the inclination direction of the measured face is obtained by analyzing the displacement of the relative distance. Further, Patent Document 3 discloses detection of boring position, in which a rolling angle of the gyroscope attached to the tube secondary from the outside in a multilayered tube is detected and rolling angle is cancelled by detaching a clutch when the rolling angle has exceeded a predetermined value.

PRIOR TECHNICAL DOCUMENTS

Patent Document

Patent Document 1: JP, Published Application No. H03-285111 (JP, A1)
Patent Document 2: JP, Published Application No. 2005-3641 (JP, A1)
Patent Document 3: JP, Published Application No. 2002-220968 (JP, A1)

Problems to be Solved by the Invention

It is considered that necessity of improvement of ground under constructed structures as a measure for preventing land subsidence due to ground liquefaction caused by earthquake will be increased from now on. Here, it is necessary in such cases of working to bore the ground directly under structures towards the aimed position in a pinpoint manner. In such a situation, a non-open cut working method with less expense is keenly desired in which the top position of boring can be specified precisely to enable boring without performing open cut of the ground even in a site where obstacles such as structures exist. However, such a boring system is not realized currently that provides a measuring apparatus with a low expense enabling position of boring to be measured precisely including cases where boring is performed directly under obstacles such as structures.

Measurement of position directly under obstacles is possible by using a position measuring apparatus provided with an accelerometer and a gyroscope as in Patent Document 1. However, it is necessary to cause the gyroscope to be rotated in use and problems of preciseness in the actual utilization as a non-open cut working method is not solved. In the techniques disclosed in Patent Document 2, the apparatus includes a part operated to perform rotational scanning as measuring means and the inclination angle cannot be so large in supporting the measured body. Along with these, the techniques are not applied to the problems such that position of underground boring is measured. Further, the techniques disclosed in Patent Document 3, as one for detecting position of boring, use a gyroscope and have problems of measurement preciseness in utilizing in actual non-open cut working. It is an object of the present invention to provide a method for measuring underground boring position and an underground boring position measuring apparatus, in which underground boring position is measured in boring with a boring system for non-open cut working so as to enable boring to be performed with the top position of boring specified precisely and to cause the non-open cut working to be of less expense.

SUMMARY OF THE INVENTION

The present invention is made to solve the aforementioned problems.

The method for measuring underground boring position according to the first aspect of the invention is one using a posture detecting sensor and a three axis magnetic sensor for measuring terrestrial magnetism provided integrally within a boring bit disposed at the top of a rod array in measuring a position of boring at the time of underground boring using a boring system for non-open cut working method that is equipped with the rod array with the boring bit attached at the top thereof and performs underground boring with successive addition of rods, comprising steps of:

establishing an xyz-coordinate system with z axis in the direction of gravity and x axis in the direction to the magnetic north and measuring the terrestrial magnetism on the ground with the three axis magnetic sensor to obtain the depression angle I of the terrestrial magnetism before boring, obtaining an inclination angle φ of the boring bit from the horizontal plane and a rotation angle ω of the boring bit around x axis from a value measured by an accelerometer integral with the boring bit at the time of boring, obtaining a directional angle θ of the boring bit from said obtained inclination angle φ and rotation angle ω around x axis along with the measured value by said three axis magnetic sensor and the depression angle I of the terrestrial magnetism obtained before boring, obtaining an amount of varied position according to boring by a length corresponding to a rod for each directional component from the obtained inclination angle φ, rotation angle θ and length corresponding to the rod, and accumulating the amount of varied position obtained in respect of boring in plural times for each directional component to obtain the position of boring corresponding to boring in plural times with successive addition of rods.

The method for measuring underground boring position according to the second aspect of the invention is characterized in that, in the first aspect, in order to correct a distortion in an output of the three axis magnetic sensor due to the boring bit itself containing the three axis magnetic sensor or magnetic materials present near the course of boring, the method further comprises steps of:

obtaining correction coefficients and offsets from the output of the three axis magnetic sensor with the boring bit set to be in plural directions, one of which is a direction in the direction to the magnetic north and another of which is a direction changed from the one, before the boring, and obtaining each directional component of the terrestrial magnetism from the output of the three axis magnetic sensor along with said obtained correction coefficients and offsets.

The method for measuring underground boring position according to the third aspect of the invention is characterized in that, in the first or second aspect, the posture detecting sensor is a three axis accelerometer measuring a gravitational acceleration.

The underground boring position measuring apparatus according to the fourth aspect of the invention is one used in underground boring with a boring system for non-open cut working method that is equipped with a rod array and a boring bit at the top thereof and performs underground boring with successive addition of rods, comprising;

a posture detecting sensor, a three axis magnetic sensor for measuring terrestrial magnetism, and a calculation processing portion having a calculation processing unit for calculation processing of measurement data acquired by measurement with each of said posture detecting sensor and three axis magnetic sensor to obtain a position of the boring bit through underground boring;

wherein said calculation processing unit performs calculation processing of:

obtaining an inclination angle φ of the boring bit from the horizontal plane and a rotation angle ω of the boring bit around x axis from a value measured by an accelerometer integral with the boring bit at the time of boring on the basis of an xyz-coordinate system with z axis in the direction of gravity and x axis in the direction to the magnetic north established on the ground before boring, obtaining a directional angle θ of the boring bit from the obtained inclination angle φ and rotation angle ω around x axis along with the measured value by said three axis magnetic sensor and a depression angle I of the terrestrial magnetism measured on the ground before boring, obtaining the amount of varied position according to boring by a length corresponding to a rod for each directional component from said obtained inclination angle φ, rotation angle θ and length corresponding to the rod, and accumulating the amount of varied position for each directional component in respect of boring in plural times to obtain the position of boring corresponding to boring in plural times with successive addition of rods.

The underground boring position measuring apparatus according to the fifth aspect of the invention is characterized in that, in the fourth aspect, the calculation processing unit performs the calculation processing for obtaining correcting coefficients and offsets from the output of the three axis magnetic sensor with the boring bit set to be in plural directions, one of which is a direction to the magnetic north and another of which is a direction changed from the one, before boring, and the calculation processing unit further obtains each directional component of the terrestrial magnetism from the output of the three axis magnetic sensor along with the obtained correcting coefficients and offsets to correct distortion in the output of the three axis magnetic sensor due to the boring bit itself containing the three axis magnetic sensor or magnetic materials present near the course of boring.

The underground boring position measuring apparatus according to the sixth aspect of the invention is characterized in that, in the fourth or fifth aspect, the posture detecting sensor is a three axis accelerometer measuring the gravitational acceleration.

According to the present invention, a posture detecting sensor and a three axis magnetic sensor are provided integrally within a boring bit, the inclination angle of the boring bit is obtained through measurement by the posture detecting sensor at each time in the course of successive boring, the directional angle of the boring bit is obtained through measurement by the three axis magnetic sensor, the advancement direction of the boring bit is obtained from these already acquired data along with the depression angle of the terrestrial magnetism measured before boring, the amount of varied position of the boring bit is obtained from the advancement direction along with the length of a rod, and the position of boring is obtained by accumulating the obtained amount of varied position successively. With such features of the present invention, the position of boring can be measured precisely and in a simple arrangement that does not contain means measuring in dynamic state such as a gyroscope in a situation where obstacles such as structures exist or even in a common case where the position of underground boring is to be measured along a desired course of boring without open cut of the ground.

DETAILED EXPLANATION OF PREFERRED EMBODIMENTS

Embodiments of the present invention will be explained below.

With the position measuring apparatus in a boring system for non-open cut working method according to the present invention, measurement of position is performed so as to enable boring with the top position of boring specified precisely without performing open cut of the ground even in a site where there are obstacles such as structures and further, in general, measurement of position is performed so as to enable boring with the top position of boring specified precisely without performing open cut of ground in a large scale.

Figure 1:
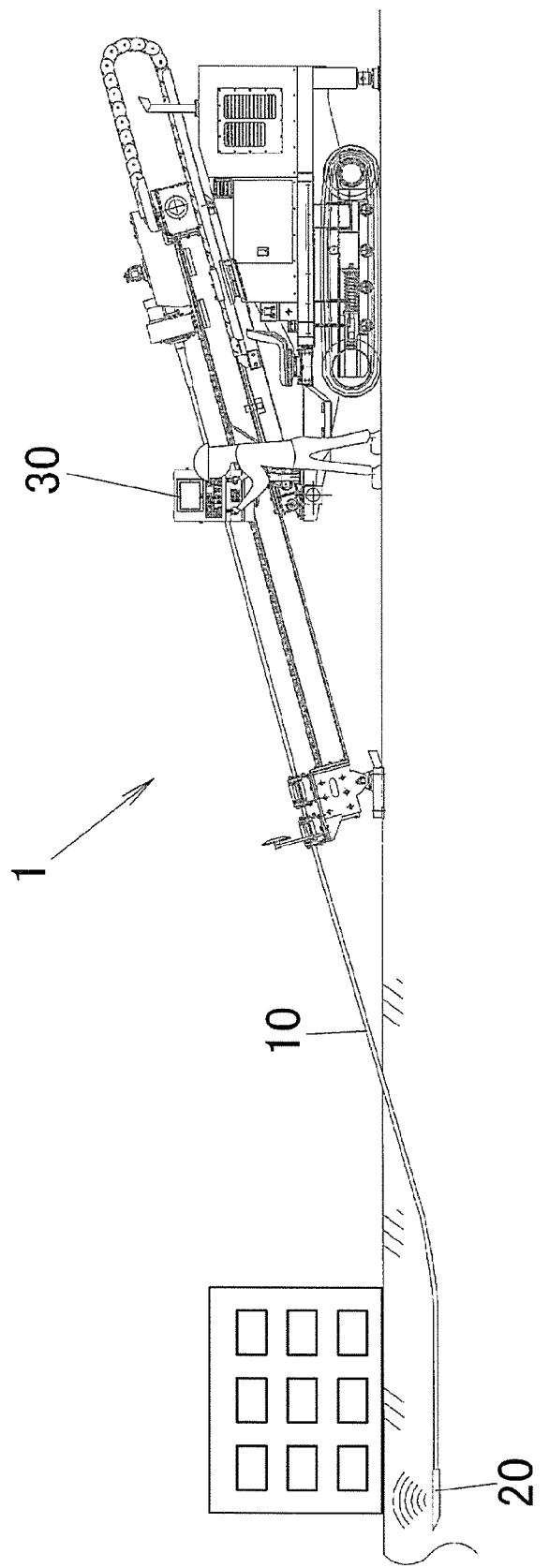
FIG. 1 is a view showing a schematic composition of a boring system for non-open cut working method provided with an underground boring position measuring apparatus according to the present invention.
Figure 2:
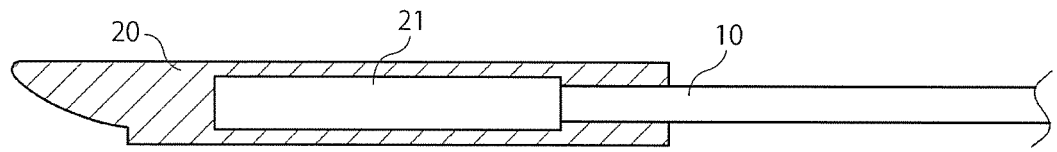
FIG. 2 is a view showing a part of the boring bit in FIG. 1.

FIG. 1 shows a schematic composition of a boring system for non-open cut working method provided with an underground boring position measuring apparatus according to the present invention and FIG. 2 shows a composition of a boring bit and sensors, etc. contained therein integrally. A boring system for non-open cut working method 1, which comprises a rod array 10 for boring and a boring bit 20 provided at the top end of the rod array 10, bores ground by means of the boring bit 20 to advance underground with successive addition of rods. Sensor data sending portion 21 for measurement of position is provided within the boring bit 20 and position measurement data is sent to a calculation processing unit 30 via the rod array 10.

With the underground boring position measuring apparatus, the angle from the reference direction (posture) of the boring bit advancing underground is detected by use of an accelerometer for measuring gravitational acceleration and a magnetic sensor for measuring terrestrial magnetism, and the position of boring is obtained by calculation using these obtained gravitational acceleration and terrestrial magnetism along with distance of boring. While a global coordinate system is x y z-coordinate system established on the ground, the x'y'z'-coordinate system moving and rotated along with the advancing boring bit provided with an accelerometer and a magnetic sensor is called as a local coordinate system, in the following explanation.

Figure 3:
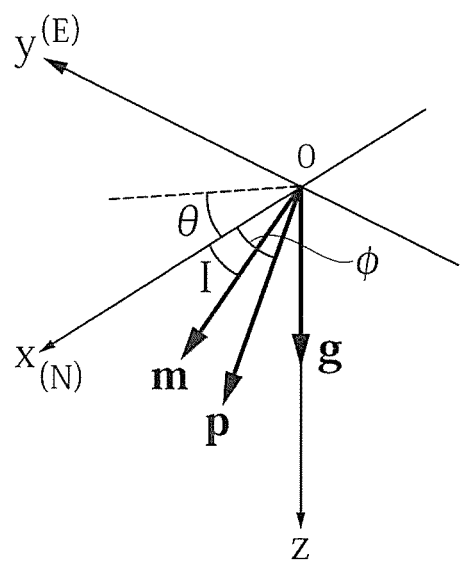
FIG. 3 is a view showing the relation among a gravitational vector, a terrestrial magnetism vector and a direction vector of the boring bit in the coordinate system established on the point for measurement.

FIG. 3 shows a terrestrial magnetism vector m and a direction vector p of the boring bit in the global coordinate system in which the magnetic north is in x direction and the gravitational vector s in z direction, at the point of measurement. In the shown state, the direction of the boring bit is in zx-plane, φ is an inclination angle from the horizontal plane and the terrestrial magnetism vector m is also in zx-plane.

The gravitational vector g is expressed as $$g = (0, 0, g_0) \tag{1}$$

where $g_0$ (m/s$^2$) is the magnitude of gravitational acceleration. The terrestrial magnetism vector m is in zx-plane and expressed as $$m = (m_0 \cos I, 0, m_0 \sin I) \tag{2}$$

where $m_0$ (nT) is the magnitude of terrestrial magnetism and I is a depression angle.

Figure 4:
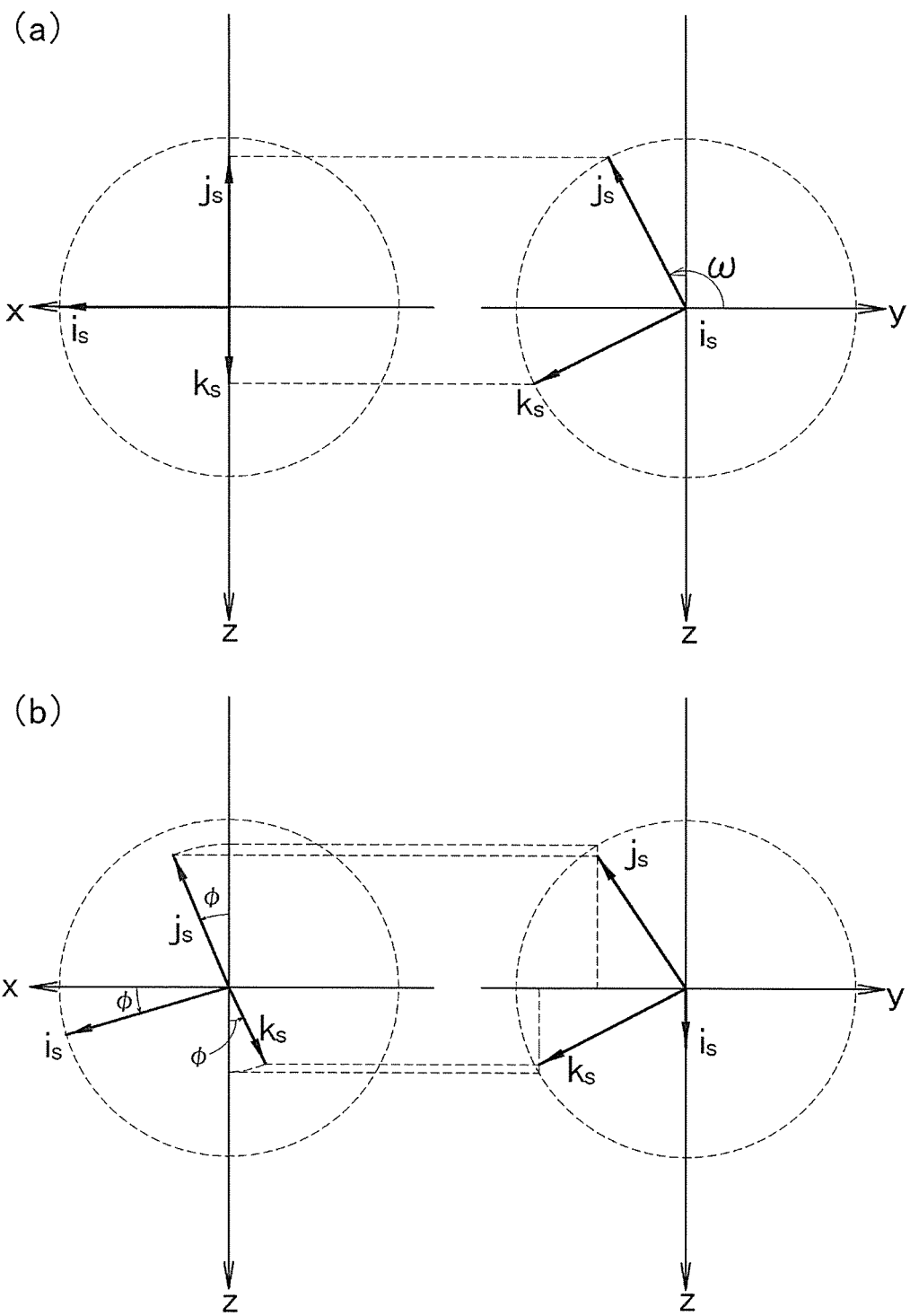
FIG. 4 (a) is a view showing the directions of the direction vector of the boring bit in three directional components when the boring bit is rotated around x axis by ω, and (b) is a view showing the direction of the direction vector of the boring bit for three directional components when the boring bit is inclined around y axis by φ from the state of (a).

Letting the advancement direction of the boring bit be in x direction, it is considered how the respective direction vectors $i_s$, $j_s$ and $k_s$ (taken as unit length vectors) in x, y and z direction of the sensor within the boring bit in a situation where the boring bit is rotated around x axis by an angle ω and inclined from the horizontal plane by an angle φ are expressed. At first, when $i_s$ direction of the sensor is aligned with +direction of x axis, $j_s$ direction of the sensor is aligned with +direction of y axis and $k_s$ direction of the sensor is aligned with −direction of z axis, after which the accelerometer is rotated counterclockwise around x axis by an angle ω, then $i_s$, $j_s$ and $k_s$ take the positions as shown in FIG. 4(a) respectively. The left half of FIG. 4 (a) shows projection onto zx-plane and the right half of FIG. 4 (a) shows projection onto yz-plane. Further, the accelerometer is inclined from the horizontal plane (xy-plane) around y axis by an angle φ as shown in FIG. 4 (b). The left half of FIG. 4 (b) shows projection onto zx-plane and the right half of FIG. 4 (b) shows projection onto yz-plane. At this time, the direction vectors $i_s$, $j_s$ and $k_s$ for three directional components in the sensor are as follows.

$$x \text{ direction: } i_s = (\cos \varphi, 0, \sin \varphi) \tag{3}$$

$$y \text{ direction: } j_s = (\sin \omega \sin \varphi, \cos \omega, -\sin \omega \cos \varphi) \tag{4}$$

$$z \text{ direction: } k_s = (\cos \omega \sin \varphi, -\cos \omega, -\cos \omega \cos \varphi) \tag{5}$$

In such a manner, the direction vector $i_s$, $j_s$ and $k_s$ in x, y and z directions of the sensor within the boring bit in a state where it is rotated around x axis by an angle ω and inclined from the horizontal plane by an angle φ are expressed by the equations (3) to (5) above. Next, the direction vectors $i_s$, $j_s$, and $k_s$ are rotated around z axis by an directional angle θ. In this case, the rotation vector Rθ is as follows.

[Eq. 1]

$$R_\theta = \begin{pmatrix} \cos\theta & -\sin\theta & 0 \\ \sin\theta & \cos\theta & 0 \\ 0 & 0 & 1 \end{pmatrix} \tag{6}$$

The direction vectors $i_s$, $j_s$ and $k_s$ after rotation become as follows.

$$i_s' = R\theta i_s = (\cos \varphi \cos \theta, \cos \varphi \sin \theta, \sin \varphi) \tag{7}$$

$$j_s' = R\theta j_s = (\cos \theta \sin \omega \sin \varphi - \sin \theta \cos \omega, \sin \theta \sin \omega \sin \varphi + \cos \theta \cos \omega, -\sin \omega \cos \varphi) \tag{8}$$

$$k_s' = R\theta k_s = (\cos \theta \cos \omega \sin \varphi + \sin \theta \cos \omega, \sin \theta \sin \omega \sin \varphi - \cos \theta \sin \omega, -\cos \omega \cos \varphi) \tag{9}$$

Consequently, respective components of the gravity ($g_x$, $g_y$, $g_z$) and the terrestrial magnetism ($m_x$, $m_y$, $m_z$) are obtained as follows.

$$g_x = g_0 \sin \varphi, g_y = -g_0 \sin \omega \cos \varphi, g_z = -g_0 \cos \omega \cos \varphi \tag{10}$$

$$m_x = m_0 (\cos \theta \cos \varphi \cos I + \sin \varphi \sin I) \tag{11}$$

$$m_y = m_0 (\cos \theta \sin \omega \sin \varphi \cos I - \sin \theta \cos \omega \cos I - \sin \omega \cos \varphi \sin I) \tag{12}$$

$$m_z = m_0(\cos\theta \cos\omega \sin\varphi \cos I + \sin\theta \sin\omega \cos I - \cos\omega \cos\varphi \sin I) \quad (13)$$

Next, the case is considered where a magnetic sensor is provided within a boring bit made of iron. In the case where a magnetic sensor is provided within a boring bit, the output of the sensor is largely distorted due to magnetic noise caused by the iron pipe present in circumference and the base plate attaching the sensor. In this case, the output of the sensor is formulated by considering the following correction coefficient and offset.

The output of the sensor $(V_x, V_y, V_z)^T$ is as follows.

[Eq. 2]

$$\begin{pmatrix} V_x \\ V_y \\ V_z \end{pmatrix} = S \begin{pmatrix} 1-\alpha_1 & 0 & 0 \\ 0 & 1-\alpha_2 & 0 \\ 0 & 0 & 1-\alpha_3 \end{pmatrix} \begin{pmatrix} m_x \\ m_y \\ m_z \end{pmatrix} + \begin{pmatrix} V_{xo} \\ V_{yo} \\ V_{zo} \end{pmatrix} \quad (14)$$

Here, S is sensitivity of the sensor (V/nT), $m_x$, $m_y$, $m_z$ are components of actual terrestrial magnetism respectively and $V_{xo}$, $V_{yo}$, $V_{zo}$ are offsets of the output voltage. When base plates or iron pipes are present in the circumference of the magnetic sensor, it is foreseen that the offsets $V_{xo}$, $V_{yo}$, $V_{zo}$ become large due to these permanent magnetism. Also, $\alpha_1$, $\alpha_2$ and $\alpha_3$ are correction coefficients for respective components that are positive numbers not exceeding 1 ($1 \leq \alpha_i < 1$; i=1, 2, 3). Such correction coefficients can be established since induced magnetism in the iron pipe due to the terrestrial magnetism acts so as to cancel the terrestrial magnetism inside of the iron pipe. With experiment of measurement, $\alpha$ is no less than 0.6 and several to about 30% of the magnitude of the actual terrestrial magnetism is observed.

Next, it is considered to obtain the correction coefficients and offsets of respective components. With the boring bit being horizontal ($\varphi=0$) and rotation angle $\omega$ being 0 (xy-plane being coincident with the horizontal plane), the following is obtained from (2) to (6), (14).

[Eq. 3]

$$\begin{pmatrix} V_x \\ V_y \\ V_z \end{pmatrix} = Sm_0 \begin{pmatrix} 1-\alpha_1 & 0 & 0 \\ 0 & 1-\alpha_2 & 0 \\ 0 & 0 & 1-\alpha_3 \end{pmatrix} \begin{pmatrix} \cos\theta \cos I \\ -\sin\theta \cos I \\ -\sin I \end{pmatrix} + \begin{pmatrix} V_{xo} \\ V_{yo} \\ V_{zo} \end{pmatrix} \quad (15)$$

Here, $m_0$ is the magnitude of the terrestrial magnetism, $\theta$ is a directional angle and I is a depression angle of terrestrial magnetism.

Directing the boring bit to the magnetic north and setting $\theta$ to be 0, output voltage of the sensor in x direction is measured at first. Following to this, measurement is performed similarly, setting $\theta$ to be $\pi/2$, $\pi$, $3\pi/2$ respectively. Then, following four equations are obtained from (15).

$$V_{x(1)} = Sm_0(1-\alpha_1)\cos I + V_{xo} \quad (16)$$

$$V_{x(2)} = V_{xo} \quad (17)$$

$$V_{x(3)} = -Sm_0(1-\alpha_1)\cos I + V_{xo} \quad (18)$$

$$V_{x(4)} = V_{xo} \quad (19)$$

The offset $V_{xo}$ in x direction is obtained from the total sum of (16) to (19) as follows.

$$V_{xo} = (V_{x(1)} + V_{x(2)} + V_{x(3)} + V_{x(4)})/4 \quad (20)$$

Further, the following is obtained from (16)-(17)-(18)+(19).

$$Sm_0(1-\alpha_1) = (V_{x(1)} - V_{x(2)} - V_{x(3)} + V_{x(4)})/2 \cos I \quad (21)$$

In a similar manner, the offsets $V_{yo}$ and correction coefficients in y direction of the sensor are as follows.

$$V_{yo} = (V_{y(1)} + V_{y(2)} + V_{y(3)} + V_{y(4)})/4 \quad (22)$$

$$Sm_0(1-\alpha_2) = (V_{y(1)} - V_{y(2)} - V_{y(3)} + V_{y(4)})/2 \cos I \quad (23)$$

Regarding z direction, measurement with $\omega$ changed is necessary, since the obtained becomes a same value by merely rotating the boring bit in the horizontal plane. Thus, x direction of the sensor is directed to the magnetic north ($\theta=0$) with setting so as to be $\omega=0$, making z axis reversed. With measurement varying $\theta$ to be 0, $\pi/2$, $\pi$, $3\pi/2$, following four equations are obtained from (15).

$$V_{z(1)} = -Sm_0(1-\alpha_3)\sin I + V_{zo} \quad (24)$$

$$V_{z(2)} = -Sm_0(1-\alpha_3)\sin I + V_{zo} \quad (25)$$

$$V_{z(3)} = -Sm_0(1-\alpha_3)\sin I + V_{zo} \quad (26)$$

$$V_{z(4)} = -Sm_0(1-\alpha_3)\sin I + V_{zo} \quad (27)$$

In the case of $\omega=\pi$, the following is obtained.

$$V_{z(5)} = Sm_0(1-\alpha_3)\sin I + V_{zo} \quad (28)$$

Calculation of the offsets and correction coefficients can be made with equation (28) and one of equations (24) to (27). However, the offsets and correction coefficients are rather obtained from the following equations that use all of equations (24) to (27), since it is also considered that rotation is not made to be in the complete horizontal plane in actual measurements.

[Eq. 4]

$$V_{zo} = \frac{V_{z(5)}}{2} + \frac{V_{z(1)} + V_{z(2)} + V_{z(3)} + V_{z(4)}}{8} \quad (29)$$

[Eq. 5]

$$Sm_0(1-\alpha_3) = \frac{V_{z(5)} - \frac{V_{z(1)} + V_{z(2)} + V_{z(3)} + V_{z(4)}}{4}}{2\sin I} \quad (30)$$

Rewriting $Sm_0(1-\alpha_1)$, $Sm_0(1-\alpha_2)$, and $Sm_0(1-\alpha_3)$ as $\beta_1$, $\beta_2$ and $\beta_3$ respectively, the following is obtained from (15).

[Eq. 6]

$$\begin{pmatrix} V_x \\ V_y \\ V_z \end{pmatrix} = \begin{pmatrix} \beta_1 & 0 & 0 \\ 0 & \beta_2 & 0 \\ 0 & 0 & \beta_3 \end{pmatrix} \begin{pmatrix} \langle m_x \rangle \\ \langle m_y \rangle \\ \langle m_z \rangle \end{pmatrix} + \begin{pmatrix} V_{xo} \\ V_{yo} \\ V_{zo} \end{pmatrix} \quad (31)$$

Here, $\langle m_x \rangle$, $\langle m_y \rangle$ and $\langle m_z \rangle$ are respective components of the terrestrial magnetism vector normalized by the magnitude of terrestrial magnetism.

The respective normalized components of the terrestrial magnetism vector $\langle m_x \rangle$, $\langle m_y \rangle$ and $\langle m_z \rangle$ become as follows from (31).

[Eq. 7]

$$\begin{pmatrix} \langle m_x \rangle \\ \langle m_y \rangle \\ \langle m_z \rangle \end{pmatrix} + \begin{pmatrix} (V_x - V_{xo})/\beta_1 \\ (V_y - V_{yo})/\beta_2 \\ (V_z - V_{zo})/\beta_3 \end{pmatrix} \quad (32)$$

In the method explained heretofore, if the correction coefficients $\beta_1$, $\beta_2$ and $\beta_3$ and the offsets of the sensor $V_{xo}$, $V_{yo}$ and $V_{zo}$ have been obtained, $\langle m_x \rangle$, $\langle m_y \rangle$ and $\langle m_z \rangle$ can be obtained from (31) using observed values $V_x$, $V_y$ and $V_z$.

In the next, a method for calculating direction angle $\theta$ using the components of terrestrial magnetism is explained. Respective normalized components of terrestrial magnetism are expressed from (11) to (13) using the directional angle $\theta$, inclination angle $\varphi$, rotation angle of the sensor $\omega$ and depression angle of terrestrial magnetism I, as follows.

$$\langle m_x \rangle = \cos\theta \cos\varphi \cos I + \sin\varphi \sin I \quad (33)$$

$$\langle m_y \rangle = \cos\theta \sin\omega \sin\varphi \cos I - \sin\theta \cos\omega \cos I - \sin\omega \cos\varphi \sin I \quad (34)$$

$$\langle m_z \rangle = \cos\theta \cos\omega \sin\varphi \cos I + \sin\theta \sin\omega \cos I - \cos\omega \cos\varphi \sin I \quad (35)$$

The directional angle $\theta$ is obtained from (33) as follows.

[Eq. 8]

$$\cos\theta = \frac{\langle m_x \rangle - \sin\phi \sin I}{\cos\phi \cos I}, \quad (33)$$

Consequently, $\theta$ becomes as follows.

[Eq. 9]

$$\theta = \cos^{-1}\left(\frac{\langle m_x \rangle - \sin\phi \sin I}{\cos\phi \cos I}\right) \quad (36)$$

Here, it is necessary to obtain the depression angle I by measurement using a depression angle measurer, etc., and to obtain the inclination angle $\varphi$ from respective components of the gravitational acceleration.

In obtaining $\theta$ through $\cos^{-1}$ by (36), $\theta$ is obtained as two values of first and fourth quadrants respectively for a positive value in ( ). It is determined according to the sign of $\sin\theta$ which of the two values the $\theta$ takes. That is, $\theta$ becomes as follows.

[Eq. 10]

$$\theta = \cos^{-1}\left(\frac{\langle m_x \rangle - \sin\phi \sin I}{\cos\phi \cos I}\right) \ldots (\sin\theta \geq 0) \quad (37)$$

[Eq. 11]

$$\theta = 2\pi - \cos^{-1}\left(\frac{\langle m_x \rangle - \sin\phi \sin I}{\cos\phi \cos I}\right) \ldots (\sin\theta < 0) \quad (38)$$

The following is obtained from (34)×$\cos\omega$−(35)×$\sin\omega$.

$$\langle m_y \rangle \cos\omega - \langle m_z \rangle \sin\omega = -\sin\theta \cos I \quad (39)$$

(39) results in as follows for $\sin\theta$.

$$\sin\theta = (-\langle m_y \rangle \cos\omega + \langle m_z \rangle \sin\omega)/\cos I \quad (40)$$

Further, the following is obtained from (33).

$$\cos\theta = (\langle mx \rangle - \sin\varphi \sin I)/\cos\varphi \cos I \quad (33)'$$

Thus, $\theta$ can be obtained also through $\tan^{-1}$ as follows.

[Eq. 12]

$$\theta = \tan^{-1}\left(\frac{(-\langle m_y \rangle \cos\omega + \langle m_z \rangle \sin\omega)/\cos I}{(\langle m_x \rangle - \sin\phi \sin I)/\cos\phi \cos I}\right) \quad (41)$$

$$= \tan^{-1}\left(\frac{-\langle m_y \rangle \cos\omega + \langle m_z \rangle \sin\omega}{(\langle m_x \rangle - \sin\phi \sin I)/\cos\phi}\right)$$

The rotation angle $\omega$ and inclination angle $\varphi$ in (41) can be obtained in a relatively easy manner from data given by the accelerometer.

In the next, the way for determining the rotation angle $\omega$ and the inclination angle $\varphi$ used to determine the directional angle $\theta$ is explained. Letting the output voltage of the accelerometer sensor be $(w_x, w_y, w_z)^T$, the following formalization is made.

[Eq. 13]

$$\begin{pmatrix} w_x \\ w_y \\ w_z \end{pmatrix} = t \begin{pmatrix} g_x \\ g_y \\ g_z \end{pmatrix} + \begin{pmatrix} w_{xo} \\ w_{yo} \\ w_{zo} \end{pmatrix} = tg_0 \begin{pmatrix} \sin\phi \\ -\sin\omega\cos\phi \\ \cos\omega\cos\phi \end{pmatrix} + \begin{pmatrix} w_{xo} \\ w_{yo} \\ w_{zo} \end{pmatrix} \quad (42)$$

Here, t is the sensitivity of the accelerometer sensor [V/(m/s²)], $g_0$ is the absolute value of gravity, $w_{xo}$, $w_{yo}$, and $w_{zo}$ are the offset components in respective directions.

At first, the way for obtaining the offset and sensitivity of the sensor by calibration is explained. The inclination angle $\varphi$ becomes 0 when acceleration is measured with the rod being horizontal. Then, (42) is simplified as follows.

[Eq. 14]

$$\begin{pmatrix} w_{xo} \\ w_{yo} \\ w_{zo} \end{pmatrix} = tg_0 \begin{pmatrix} 0 \\ -\sin\omega \\ \cos\omega \end{pmatrix} + \begin{pmatrix} w_{xo} \\ w_{yo} \\ w_{zo} \end{pmatrix} \quad (43)$$

In measuring with the rotation angle $\omega$ varied to be 0, $\pi/2$, $\pi$ and $3\pi/2$, the output voltage of the respective components becomes as follows.

x component:

$$w_{x(1)} = w_{x(2)} = w_{x(3)} = w_{x(4)}$$

y component:

$$w_{y(1)} = w_{y(3)} = w_{yo}, w_{y(2)} = -tg_0 + w_{yo},$$

$$w_{y(4)} = tg_0 + w_{yo}$$

z component:

$$w_{z(1)} = tg_0 + w_{zo}, w_{z(2)} = w_{z(4)} = w_{zo},$$

$$w_{z(3)} = -tg_0 + w_{zo}$$

Here, in the attached denotation to the offset components, (1), (2), (3) and (4) denote that these are of the output voltages when (1) "$\omega=0$", (2) "$\omega=\pi/2$", (3) "$\omega=\pi$" and (4) "$\omega=3\pi/2$" respectively.

From the above, the offsets in respective direction are obtained by the following equations.

$$w_{xo}=(w_{x(1)}+w_{x(2)}+w_{x(3)}+w_{x(4)})/4 \quad (44)$$

$$w_{yo}=(w_{y(1)}+w_{y(2)}+w_{y(3)}+w_{y(4)})/4 \quad (45)$$

$$w_{zo}=(w_{z(1)}+w_{z(2)}+w_{z(3)}+w_{z(4)})/4 \quad (46)$$

Further, the following equation is obtained as to the sensitivity t of the sensor.

$$tg_0=(w_{z(1)}-w_{y(2)}-w_{z(3)}+w_{y(4)})/4 \quad (47)$$

Replacing $tg_0$ by $\gamma$, the acceleration components $\langle g_x \rangle$, $\langle g_y \rangle$ and $\langle g_z \rangle$ normalized by $g_0$ are obtained using observed value $(w_x, w_y, w_z)^T$ as follows.

[Eq. 15]

$$\begin{pmatrix} \langle g_x \rangle \\ \langle g_y \rangle \\ \langle g_z \rangle \end{pmatrix} = \begin{pmatrix} \sin\phi \\ -\sin\omega\cos\phi \\ \cos\omega\cos\phi \end{pmatrix} = \begin{pmatrix} (w_x - w_{xo})/\gamma \\ (w_y - w_{yo})/\gamma \\ (w_z - w_{zo})/\gamma \end{pmatrix} \quad (48)$$

In the next, the way for obtaining the inclination angle $\phi$ and the rotation angle $\omega$ from $(\langle g_x \rangle, \langle g_y \rangle$ and $\langle g_z \rangle)^T$ obtained through measurement is explained.

Since $\sin\phi = \langle g_x \rangle$ from (48), $\phi$ becomes as follows.

$$\phi = \sin^{-1}\langle g_x \rangle \quad (49)$$

Further, considering $-\sin\omega\cos\phi = \langle g_y \rangle$, $\cos\omega\cos\phi = \langle g_z \rangle$ in (48), and
using the following relation:

[Eq. 16]

$$\tan\omega = \frac{\sin\omega}{\cos\omega} = \frac{-\langle g_y \rangle/\cos\phi}{\langle g_z \rangle/\cos\phi} = \frac{-\langle g_y \rangle}{\langle g_z \rangle}$$

$\omega$ becomes as follows.

$$\omega = \tan^{-1}(\langle g_y \rangle/\langle g_z \rangle) \quad (50)$$

When the directional angle $\theta$ and the inclination angle $\phi$ are obtained, the position vector of top position of the rod becomes as follows.

$$Li_s' = (L\cos\phi\cos\theta, L\cos\phi\sin\theta, L\sin\phi)$$

Here, L is the length of the rod. In the case where boring is performed adding rods successively, the final position can be calculated by summing position vectors of respective rods sequentially. That is, the directional angle $\theta$ and the inclination angle $\phi$ at a position are obtained from the values measured with the sensors. Then, using the obtained direction and the movement distance of a rod having advanced in boring, the amount of varied position vector is obtained. A series of such operations are accumulated sequentially according to addition of rods.

The top position of the boring bit when such boring in N times along with successive addition of rods has been performed is expressed by the following equation.

[Eq. 17]

$$\begin{pmatrix} x_N \\ y_N \\ z_N \end{pmatrix} = \begin{pmatrix} \sum_{i=1}^{N} L_i \cos\phi_i \cos\theta_i \\ \sum_{i=1}^{N} L_i \cos\phi_i \sin\theta_i \\ \sum_{i=1}^{N} L_i \sin\phi_i \end{pmatrix} \quad (51)$$

Here, $x_N$, $y_N$ and $z_N$ are respective coordinates after boring in N times and $L_i$, $\theta_i$ and $\phi_i$ are the length, directional angle and inclination angle of i-th rod respectively. In this, i=1 corresponds to the case where boring is performed with the first rod, i=2 corresponds to the case where boring is made with the second rod added and further rod is added successively for each step of boring. This manner of obtaining the underground boring position is based on approximating the course of boring with successive addition of rods by a polygonal line.

Procedure of measuring the position of boring corresponding to boring and addition of rods will be explained.

At first, the depression angle I of the terrestrial magnetism is measured with a magnetic sensor before boring. The value of I obtained at this time does not change at the time when boring is performed. At the time of boring, the inclination angle $\phi$ from the horizontal plane is obtained by (49) from the value measured by an accelerometer integral with the boring bit and the rotation angle $\omega$ around x axis is obtained by (50). In the next, the directional angle $\theta$ is obtained by (41) from the obtained inclination angle $\phi$ and rotational angle $\omega$ around x axis along with the measured value by a magnetic sensor. Further, the amount of varied position according to boring by a length corresponding to a rod is obtained for each directional component from the inclination angle $\phi$, rotation angle $\theta$ and length corresponding to a rod. The amount of varied top position of the boring bit by successive boring in N times is obtained by (51).

Figure 5:
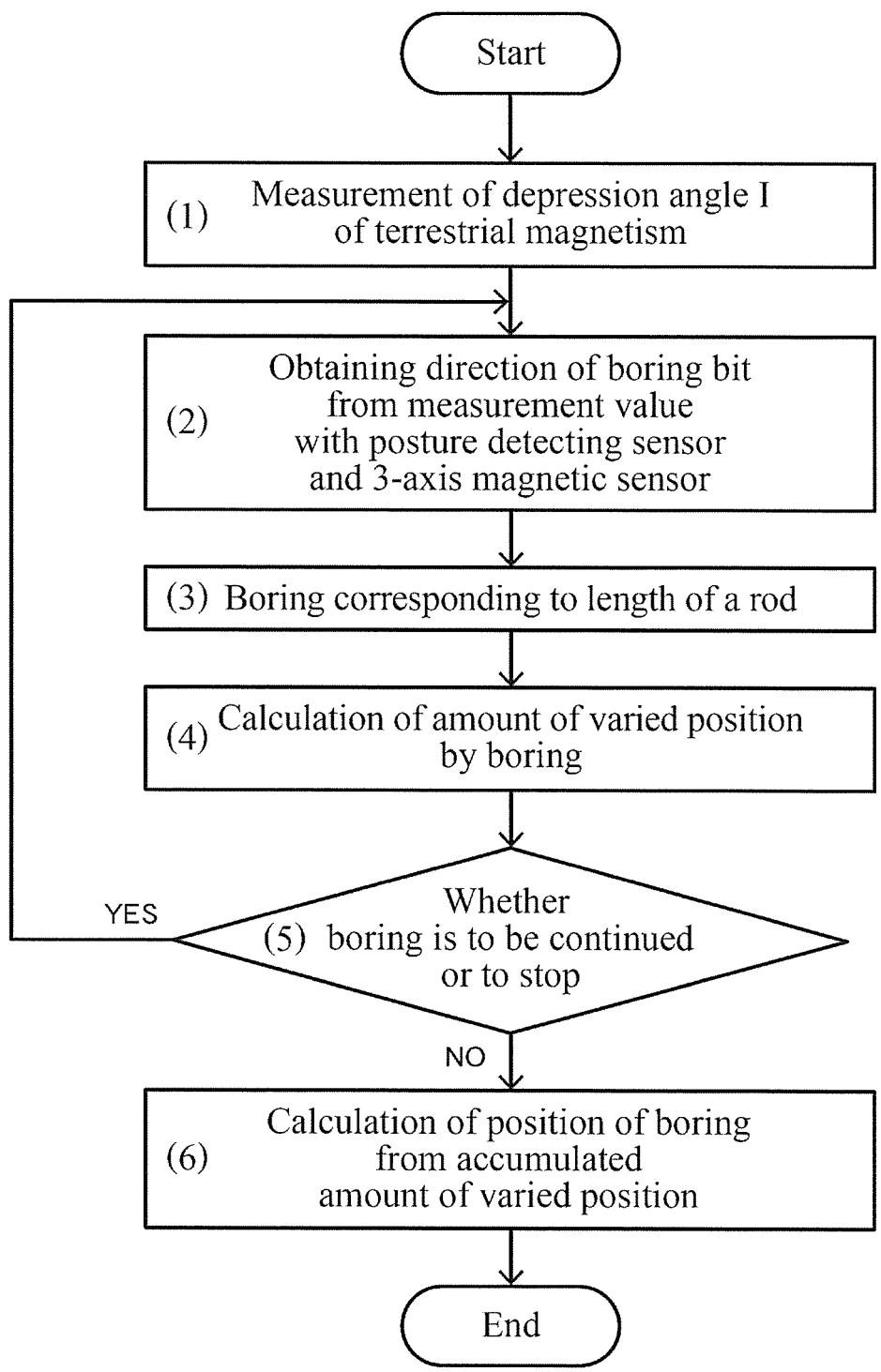
FIG. 5 is a flowchart showing the sequence of measuring boring position.

FIG. 5 is a flowchart showing these procedures. In Step (1), the measurement of the depression angle I is performed only at the first time. In Step (2), the direction of the boring bit is obtained. In Step (3), boring corresponding to the length of a rod is performed. In Step (4), calculation of the varied amount of position is performed for each step of boring corresponding to the length of a rod. Procedure after the boring corresponding to the length of a rod depends on the operation command signal as to whether further boring is to be performed or boring is to end. In the case of performing further boring (YES), Steps (2) to (4) are repeated. In the case to end boring (NO), position of boring is calculated according to the amount of varied position accumulated until then in Step (6).

[Underground Boring Position Measuring Apparatus]

The underground boring position measuring apparatus is composed to comprise a sensor data sending portion provided within a boring bit 20 provided at the top of a rod 10 for boring of a boring system for non-open cut working method and a calculation processing portion 30 on the receiving side provided in a station established on the ground, as shown in FIG. 1.

Figure 6:
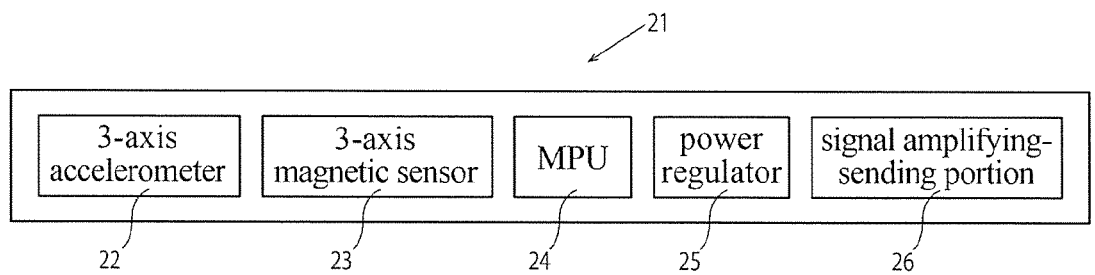
FIG. 6 is a view showing the composition of a sensor data sending portion provided on the side of the boring bit.

FIG. 6 shows the composition of the sensor data sending portion 21 provided within the boring bit 20, which is equipped with a three axis accelerometer 22 as a posture detecting sensor, a three axis magnetic sensor 23, an MPU 24, a power regulator 25 and a signal amplifying-sending portion 26, and which may be composed so as to provide these elements implemented on a base plate for sending position measurement data. Measurement data for obtaining the posture of the boring bit is acquired through analog to digital conversion of values measured with the three axis accelerometer 22 and data for obtaining the directional angle is acquired through analog to digital conversion of values measured with the three axis magnetic sensor 23. These data are processed by the MPU 24 to be data for sending, which are sent to a calculation processing portion 30 via the signal amplifying-sending portion 26.

Figure 7:
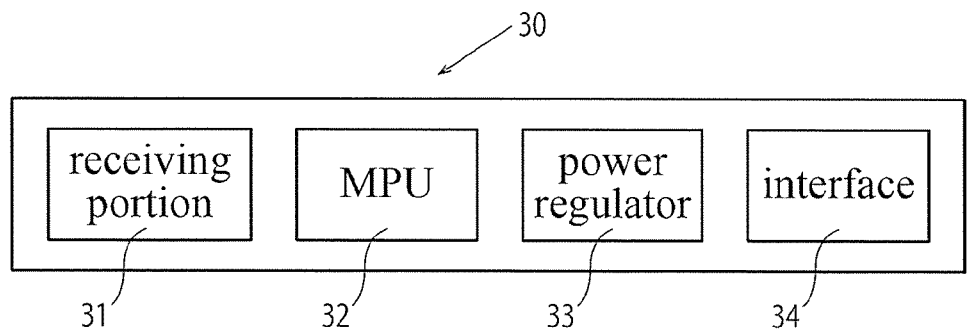
FIG. 7 is a view showing the composition of a receiving portion provided on the ground side.

As shown in FIG. 7, the calculation processing portion 30 may be composed so as to comprise a part, in which a sending portion 31, an MPU 32, a power regulator 33 and an interface 34 are implemented on a base plate for receiving position measurement data, and a calculation processing unit (not shown). The sending portion 31 receives data sent from a measurement data creating portion on the sending side, performs filtering and sends the data to the MPU 32, which sends the data to the calculation processing unit via the interface 34. The calculation processing unit, which may be a usual personal computer, extracts data out of the acquired data and performs calculation processing for obtaining the posture and direction of the boring bit and further for obtaining the position of boring corresponding to boring—addition of rods to display the result on a monitor (not shown).

With the calculation processing unit, calculation is performed such that the inclination angle $\varphi$ from the horizontal plane and the rotation angle $\omega$ around x axis are obtained from the measurement values acquired by the three axis accelerometer; the directional angle $\theta$ is obtained from the obtained inclination angle $\varphi$ and rotation angle $\omega$ around x axis, the measurement values acquired by the three axis magnetic sensor and the depression angle I measured with the three axis magnetic sensor on the ground before boring; the amount of varied position by boring corresponding to the length of a rod is obtained for each directional component from thus obtained inclination angle $\varphi$, directional angle $\theta$ and length L of a rod; and then the position of boring in plural times with successive addition of rods is obtained through accumulating the amount of varied position for each directional component obtained for boring at each of plural times.

As to the data sending system for sending data from the sending side to the receiving side, an arrangement may be employed such that the signal of data is modulated in the signal amplifying-sending portion 26 and sent to the receiving side via the cable provided in the rods or such an arrangement may be employed such that oscillation is generated in the signal amplifying-sending portion 26 using a giant-magnetostriction element and the vibration is brought to the rods and received with a giant-magnetostriction element or a microphone on the receiving side.

While an example of detecting the posture of the boring bit with the three axis accelerometer provided integrally within the boring bit as a posture detecting sensor, another posture detecting may be employed such as detection of inclination angle from a reference direction with an inclination sensor. As to the inclination sensor, there are one using liquid that detects inclination of liquid surface or uneven distribution of gas foam, one using a weight that measures eccentricity of the weight to obtain the inclination angle or the like. Also by employing such an inclination sensor, it is possible to acquire data for obtaining the position of boring similarly as the three axis accelerometer. In recent years, inclination sensors are produced such that it can measure a small inclination angle near to the horizon with a high preciseness. As such, it is also considered to measure the position of boring more precisely using an inclination sensor in the case where a small inclination angle near to the horizontal plane is important.

APPLICABILITY IN INDUSTRY

According to the present invention, measurement of underground boring position can be performed with an apparatus having a simple and less expensive composition that employs a posture detecting sensor as a static measuring means and a three axis magnetic sensor. The techniques can be applied to performing working with boring or survey in a site where there are obstacles such as structures on the ground. Further, as to an common working with boring, the techniques can be applied to precise measurement of underground boring position in a non-open cut working that is performed without open cut of the ground in a large scale.

What is claimed is:

1. A method for measuring underground boring position using a posture detecting sensor and a three axis magnetic sensor for measuring a terrestrial magnetism provided integrally within a boring bit disposed at the top of a rod array in measuring a position of boring at the time of underground boring using a boring system for non-open cut working method that is equipped with the rod array with the boring bit attached at the top thereof and performs underground boring with successive addition of rods, comprising steps of:

establishing an xyz-coordinate system with z axis in the direction of gravity and x axis in the direction to the magnetic north and measuring the terrestrial magnetism on the ground with the three axis magnetic sensor to obtain a depression angle I of the terrestrial magnetism before boring, obtaining an inclination angle $\varphi$ of the boring bit from a horizontal plane and a rotation angle $\omega$ of the boring bit around x axis from a value measured by an accelerometer integral with the boring bit at the time of boring, obtaining a directional angle $\theta$ of the boring bit from the obtained inclination angle $\varphi$ and the rotation angle $\omega$ around x axis along with the measured value by the three axis magnetic sensor and the depression angle I of the terrestrial magnetism obtained before boring, obtaining an amount of varied position according to boring by a length corresponding to a rod for each directional component from the obtained inclination angle $\varphi$, rotation angle $\theta$ and length corresponding to the rod, and accumulating the amount of varied position obtained in respect of boring in plural times for each directional component to obtain the position of boring corresponding to boring in plural times with successive addition of rods.

2. A method for measuring underground boring position according to claim 1, wherein, in order to correct a distortion in an output of the three axis magnetic sensor due to the boring bit itself containing the three axis magnetic sensor or magnetic materials present near a course of boring, the method further comprises steps of:

obtaining correction coefficients and offsets from the output of the three axis magnetic sensor with the boring bit set to be in plural directions, one of which is a direction in the direction to the magnetic north and another of which is a direction changed from the one, before the boring, and obtaining each directional component of the terrestrial magnetism from the output of the three axis magnetic sensor along with the obtained correction coefficients and offsets.

3. A method for measuring underground boring position according to claim 2, wherein the posture detecting sensor is a three axis accelerometer measuring a gravitational acceleration.

4. A method for measuring underground boring position according to claim 1, wherein the posture detecting sensor is a three axis accelerometer measuring a gravitational acceleration.

5. An underground boring position measuring apparatus used in underground boring with a boring system for non-open cut working method that is equipped with a rod array and a boring bit at the top thereof and performs underground boring with successive addition of rods, comprising;
  a posture detecting sensor,
  a three axis magnetic sensor for measuring a terrestrial magnetism, and
  a calculation processing portion having a calculation processing unit for a calculation processing of measurement data acquired by measurement with each of the posture detecting sensor and the three axis magnetic sensor to obtain a position of the boring bit through underground boring;
  wherein the calculation processing unit performs the calculation processing of:
  obtaining an inclination angle φ of the boring bit from a horizontal plane and a rotation angle ω of the boring bit around x axis from a value measured by an accelerometer integral with the boring bit at the time of boring on the basis of an xyz-coordinate system with z axis in the direction of gravity and x axis in the direction to the magnetic north established on the ground before boring,
  obtaining a directional angle θ of the boring bit from the obtained inclination angle φ and the rotation angle ω around x axis along with the measured value by the three axis magnetic sensor and a depression angle I of the terrestrial magnetism measured on the ground before boring,
  obtaining an amount of varied position according to boring by a length corresponding to a rod for each directional component from the obtained inclination angle φ, rotation angle θ and length corresponding to the rod, and
  accumulating the amount of varied position for each directional component in respect of boring in plural times to obtain the position of boring corresponding to boring in plural times with successive addition of rods.

6. An underground boring position measuring apparatus according to claim 5, wherein
  the calculation processing unit performs the calculation processing for obtaining correction coefficients and offsets from an output of the three axis magnetic sensor with the boring bit set to be in plural directions, one of which is a direction to the magnetic north and another of which is a direction changed from the one, before boring, and
  the calculation processing unit further obtains each directional component of the terrestrial magnetism from the output of the three axis magnetic sensor along with the obtained collecting coefficients and the offsets to correct distortion in the output of the three axis magnetic sensor due to the boring bit itself containing the three axis magnetic sensor or magnetic materials present near a course of boring.

7. An underground boring position measuring apparatus according to claim 6, wherein
  the posture detecting sensor is a three axis accelerometer measuring a gravitational acceleration.

8. An underground boring position measuring apparatus according to claim 5, wherein
  the posture detecting sensor is a three axis accelerometer measuring a gravitational acceleration.

* * * * *